US011012865B2

United States Patent
Macmullan et al.

(10) Patent No.: US 11,012,865 B2
(45) Date of Patent: *May 18, 2021

(54) METHOD AND SYSTEM FOR PROVIDING SPECTRUM SENSING CAPABILITY IN A SHARED NETWORK

(71) Applicant: Federated Wireless, Inc., Arlington, VA (US)

(72) Inventors: Samuel Jay Macmullan, Carlisle, MA (US); Sepehr Mehrabanzad, Wellesley, MA (US); Peter Harbour, Framingham, MA (US); Creighton Eldridge, Cambridge, MA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,189

(22) Filed: Aug. 29, 2019

(65) Prior Publication Data

US 2019/0387414 A1 Dec. 19, 2019

Related U.S. Application Data

(63) Continuation of application No. 16/041,466, filed on Jul. 20, 2018, now Pat. No. 10,405,194, which is a (Continued)

(51) Int. Cl.
*H04W 16/14* (2009.01)
*H04B 17/318* (2015.01)
(Continued)

(52) U.S. Cl.
CPC .......... *H04W 16/14* (2013.01); *H04B 17/318* (2015.01); *H04L 43/0829* (2013.01); *H04W 52/243* (2013.01)

(58) Field of Classification Search
CPC .................. H04B 17/318; H04B 1/10; H04B 1/7097–711; H04B 1/1027–1036;
(Continued)

(56) References Cited

U.S. PATENT DOCUMENTS 9,253,672 B1\* 2/2016 Boyle .................. H04L 67/12
2012/0039265 A1\* 2/2012 Patel ................... H04W 52/143
370/329

(Continued)

*Primary Examiner* — Ronald Eisner
(74) *Attorney, Agent, or Firm* — Finnegan, Henderson, Farabow, Garrett & Dunner, LLP

(57) ABSTRACT

A method and system is provided for enabling spectrum sensing capability in a network having at least one primary user and a plurality of secondary users configured to communicate using a shared spectrum. The methods and systems include receiving values from sensors corresponding to received signal strength from a primary user in one or more frequencies of the shared spectrum. The values are used to interpolate at least one additional value between the sensors. A detection threshold is determined for sensing a signal transmitted from the primary user based on an acceptable amount of interference. The primary user is then determined to be transmitting in the one or more frequencies of the shared spectrum if any of the values received from the plurality of sensors or the at least one additional value interpolated along the path exceeds the detection threshold.

40 Claims, 10 Drawing Sheets

Related U.S. Application Data continuation of application No. 15/596,764, filed on May 16, 2017, now Pat. No. 10,057,782.

(60) Provisional application No. 62/337,323, filed on May 16, 2016.

(51) Int. Cl.
*H04W 52/24* (2009.01)
*H04L 12/26* (2006.01)

(58) Field of Classification Search
CPC ...... H04B 1/715–719; H04B 15/00–04; H04B 2215/00; H04L 43/0829; H04L 5/0073; H04W 16/14; H04W 52/243; H04W 4/02–029; H04W 64/00–006; H04W 28/0236; H04W 52/24–244; H04W 72/082
USPC ........ 455/404.1, 404.2, 456.1–457; 340/539.13, 988–996; D10/104.2
See application file for complete search history.

(56) References Cited

U.S. PATENT DOCUMENTS

| | | | |
|---|---|---|---|
| 2012/0082038 A1* | 4/2012 | Xu | H04L 5/0044 370/244 |
| 2012/0093028 A9* | 4/2012 | Mese | H04W 72/082 370/254 |
| 2013/0077497 A1* | 3/2013 | Bae | H04W 74/0858 370/241 |
| 2014/0044081 A1* | 2/2014 | Mark | H04W 52/143 370/329 |
| 2014/0064114 A1* | 3/2014 | Wang | H04L 27/0006 370/252 |
| 2015/0018018 A1 | 1/2015 | Shen et al. | |
| 2015/0038149 A1* | 2/2015 | Yavuz | H04W 52/246 455/437 |
| 2017/0034831 A1 | 2/2017 | Yerramalli et al. | |
| 2017/0188241 A1* | 6/2017 | Mueck | H04W 16/14 |
| 2017/0188314 A1* | 6/2017 | Mueck | H04W 52/243 |

\* cited by examiner

METHOD AND SYSTEM FOR PROVIDING SPECTRUM SENSING CAPABILITY IN A SHARED NETWORK

CROSS-REFERENCE TO RELATED APPLICATIONS

This application is a continuation of U.S. application Ser. No. 16/041,466, filed Jul. 20, 2018, which is a continuation of U.S. application Ser. No. 15/596,764, entitled "Method and System for Providing Spectrum Sensing Capability in a Shared Network," filed May 16, 2017, which claims the benefit of Provisional Application No. 62/337,323 filed May 16, 2016, each of which is hereby incorporated by reference in its entirety.

FIELD OF INVENTION

The present invention relates to techniques for shared spectrum access in wireless networks and, more particularly, to methods, systems, and apparatuses for providing spectrum sensing capability in such networks.

BACKGROUND

Radio frequency (RF) spectrum is the foundation for many wireless communications systems in use today, including radar and cellular communications systems. Specified frequency ranges in the RF spectrum, sometimes identified as bands or channels, may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party gets one or more frequency assignments, in the form of a license, to operate a radio transmitter on specific frequencies within a particular geographic location.

The system of spectrum allocation, allotment, and assignment is failing to keep pace with the increasing demand for spectrum. Therefore there is a need to improve how available spectrum can be efficiently allocated, allotted, and assigned in the face of growing demand. Unless otherwise noted, "allocation" is used in the present disclosure to generally refer to the process by which spectrum is allocated, allotted, and assigned to licensed users.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz Federal band recently made available for shared commercial use in the United States. In another example, a DSA system may be used to share access to unlicensed spectrum, such as TV Whitespace. Coordinating and managing multi-user access to a shared spectrum present challenges in a DSA system.

As demand for spectrum grows, shared spectrum usage is becoming more common. In these environments, an SAS may control spectrum access among users assigned to different priority levels (or "tiers") of spectrum access privileges. The SAS may implement spectrum management policies for users in each tier. For example, the SAS may be configured to protect spectrum usage by higher-priority users (e.g., "primary users") in shared bands from interference that would result from communications by lower-priority users (e.g., "secondary users"). As used herein, a "user" may refer to user equipment (e.g., a mobile phone, etc.), or an entity or person using user equipment. In many cases where there are relatively few primary users, spectrum usage by primary users may be low. Therefore, secondary users may dominate overall usage in the spectrum. However, whether in regions with high or low primary user spectrum usage, an SAS ensures that any spectrum allocations to secondary users does not create unacceptable levels of interference with the primary users transmitting in the shared spectrum.

A key feature of many DSA systems is the ability to identify primary users so they can be protected from harmful interference from secondary users. In some circumstances, primary users remain at fixed locations and can therefore be registered in a database accessed by the SAS. In these cases, the SAS can use information from the database associated with the primary user, including location, system parameters, receiver sensitivity, filtering, antenna height, pattern, azimuth, and elevation, to ensure that any secondary user assignment does not cause harmful interference to the primary user.

In other circumstances, primary users may not be static and may be mobile. Further still, primary users may be unable to share their location and/or system parameters with an SAS for security or confidentiality reasons. An example of one such primary user of this type includes primary users operating federal radar systems on sea-going military vessels (e.g., military ships and submarines). To protect these primary users from secondary user interference, an SAS requires a spectrum sensing capability, for example, using an Environmental Sensing Capability (ESC) system, to determine when and where the primary user is operating and, optionally, determine system parameters associated with the primary user. The SAS would leverage ESC system reports to ensure an acceptable quality of service for primary users transmitting in the shared spectrum, while also maximizing throughput and capacity for the secondary users using the same spectrum. Moreover, the ESC system may provide operational security (OPSEC) and communications security (COMSEC), for example, to avoid compromising the locations and/or system parameters of the primary users while also protecting them from secondary-user interference in the shared spectrum.

SUMMARY

In one aspect, the present disclosure is directed to a method for providing spectrum sensing capability in a network having at least one primary user and a plurality of secondary users configured to communicate using a shared spectrum. In accordance with the disclosed embodiments of the invention, the method may include receiving, from a plurality of sensors positioned at different locations in the network, values corresponding to received signal strength from the at least one primary user in one or more frequencies of the shared spectrum, the locations of the plurality of sensors defining a path. The method may further include using the values received from the plurality of sensors to interpolate at least one additional value corresponding to a received signal strength at a location between sensors along the path, determining a detection threshold for sensing a signal transmitted from the at least one primary user based on an acceptable amount of interference, and determining that the at least one primary user is transmitting in the one or more frequencies of the shared spectrum if any of the values received from the plurality of sensors or the at least one additional value interpolated along the path exceeds the detection threshold.

In another aspect, the present disclosure is directed to a system configured to provide spectrum sensing capability in a network having at least one primary user and a plurality of secondary users configured to communicate using a shared spectrum. In accordance with the disclosed embodiments of the invention, the system may include a memory storing instructions for execution by a processor. The processor may be configured to execute the stored instructions to receive, from a plurality of sensors positioned at different locations in the network, values corresponding to received signal strength from the at least one primary user in one or more frequencies of the shared spectrum, the locations of the plurality of sensors defining a path. The processor may further be configured to execute the stored instructions to use the values received from the plurality of sensors to interpolate at least one additional value corresponding to a received signal strength at a location between sensors along the path, to determine a detection threshold for sensing a signal transmitted from the at least one primary user based on an acceptable amount of interference, and to determine that the at least one primary user is transmitting in the one or more frequencies of the shared spectrum if any of the values received from the plurality of sensors or the at least one additional value interpolated along the path exceeds the detection threshold.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

Figure 1:
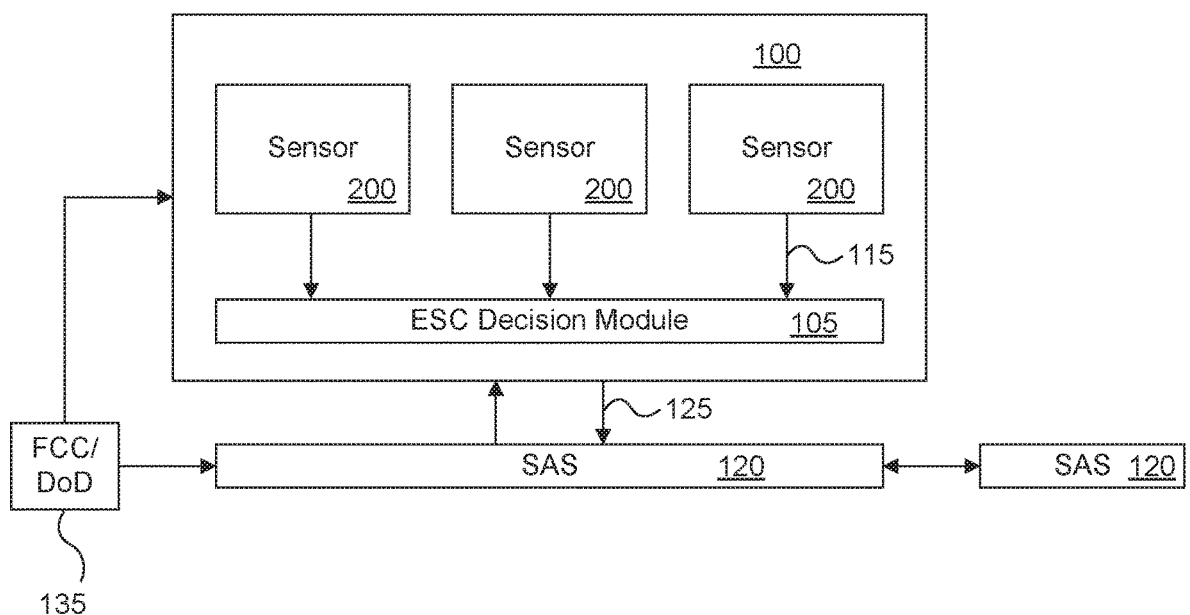
FIG. 1 is a schematic block diagram of an exemplary spectrum sensing system in accordance with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 illustrates a schematic block diagram of an exemplary ESC system 100 and may include, among other things, an ESC decision module 105 and a plurality of sensors 200. The sensors 200 receive RF signals transmitted by at least one primary user in a shared spectrum and are configured to communicate with the ESC decision module 105 over a secure data link 115. The ESC decision module 105 may be configured to detect when the at least one primary user is transmitting over a single frequency and/or within a predetermined frequency channels (i.e., having defined frequency bandwidths) in the shared spectrum.

The ESC system 100 communicates with one or more SASs 120 at least when a primary user is detected transmitting within the shared spectrum. For example, the ESC decision module 105 may generate an indication that it has detected a primary user using the shared spectrum and send the indication to the one or more SASs over a secure data link 125. The one or more SASs may be configured to monitor the activity (e.g., RF transmissions) of a plurality of secondary users in the shared spectrum, and may be further configured to relocate, suspend, and/or limit RF spectrum usage by the secondary users when the ESC system 100 indicates that it has detected a primary user transmitting in the shared spectrum. In one embodiment, the secondary users may include Citizens Broadband Service Devices (CBSDs), the primary users may include Federal Incumbent Users (e.g., government or military users), and the shared spectrum may include the 3.5 GHz Federal band. However, one skilled in the art would recognize that in other embodiments the ESC system 100 may operate in different frequency bands and with different primary and secondary users.

In a preferred embodiment, the plurality of sensors 200 are distributed over a wide area and each communicates with the ESC decision module 105 using a respective secure data link 115. Alternatively, the sensors 200 may be configured to communicate with the ESC decision module 105 through a common gateway, for example, directing all communications to a single sensor 200 in communication with the ESC decision module. The secure data link 115 preferably includes a low-latency wireless or wired interface. In some embodiments, each of the sensors 200 may receive and process RF signals from at least one primary user, and may transmit to the ESC decision module 105 values indicative of received signal strengths that the sensor 200 determined in one or more frequencies and/or frequency channels. The processing of RF signals received at each sensor 200 for the purpose of determining values indicative of received signal strengths may be performed within the sensor or at a location remote from each sensor, or using a combination of local and remote data processing.

Figure 2:
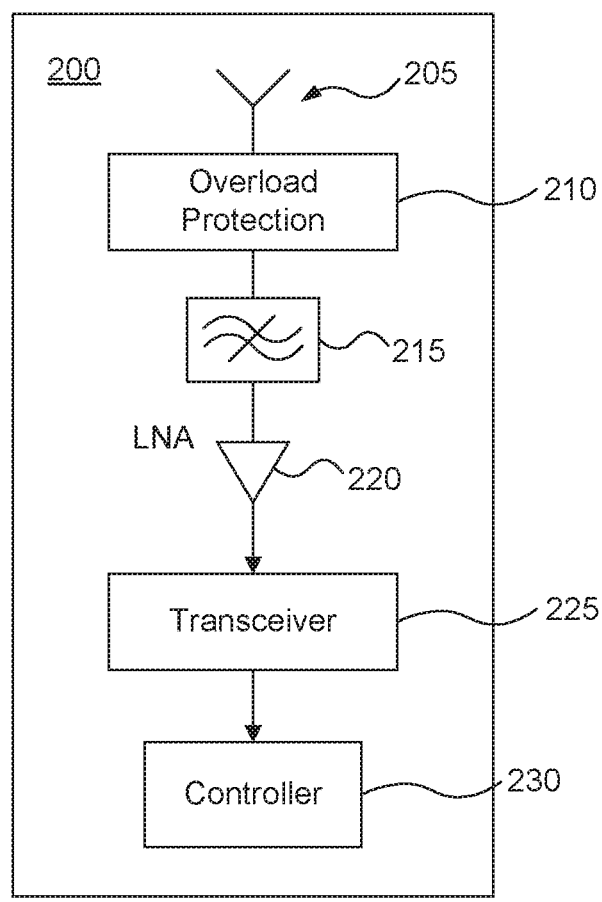
FIG. 2 is a schematic block diagram of an exemplary sensor that may be used in the spectrum sensing system of FIG. 1.

Referring to FIG. 2, each sensor 200 may comprise hardware for receiving and processing RF signals, including for example an antenna 205, an RF limiter 210, a filter 215, an amplifier 220, a transceiver 225, and a controller 230. In the exemplary embodiments, the antenna 205 comprises a 180-degree horizontal beamwidth and a 6 dBi gain. In some embodiments, the antennas 205 of a plurality of sensors 200 may monitor RF signals transmitted within a wide geographic area and may include overlapping coverage areas. In certain disclosed embodiments, each antenna 205 may be generally directed perpendicularly with respect to an area in which primary users are expected to be transmitting and away from an area in which secondary users may be transmitting. For example, if the primary users are military ships at sea, the sensor antenna 205 may be located close to a coastline and directed out to sea, whereas the secondary users would be positioned inland behind the antenna. In such an exemplary arrangement, a 180-degree antenna beamwidth may provide a suitable compromise between detecting at least one primary user's RF signals while avoiding secondary-user interference from signals transmitted in an area behind the antenna. Moreover, using a 180-degree beamwidth antenna may prevent use of precision angle of arrival (AoA) estimates, thereby maintaining operational security (OPSEC) for the primary users whose locations must remain uncertain.

The RF limiter 210 may be coupled to the antenna 205 to attenuate the received RF signal power and prevent potentially overloading the sensor's circuitry. The filter 215 may provide a bandpass filter that only allows received RF signals in a desired frequency band to pass. In one disclosed embodiment, the passband of the filter 215 may be adapted to pass signals between 3550-3650 MHz so that signals in the 3.5 GHz Federal band may be processed. The attenuated and filtered signals next may be processed by the amplifier 220, which may comprise a low noise amplifier (LNA) configured to amplify the signal power prior to further processing by the transceiver 225. In one embodiment, the signal-to-noise ratio provided by the LNA 220 is 5.5 dB and the transceiver's digital bandwidth is 49 MHz. In this disclosed embodiment, the sensor 200 monitors frequencies in the 3.5 GHz band (e.g., 3550-3650 MHz) and may switch between 3550-3600 MHz and 3600-3650 MHz sub-bands or between other sub-bands as appropriate for the implementation. The sensor 200 may dwell for a period of time on each sub-band before switching. In one exemplary embodiment, the sensor 200 may dwell on each sub-band for thirty seconds before switching. This allows any newly-transmitted signal in the 3550-3650 MHz band to be detected by the sensor 200 within sixty seconds.

The transceiver 225 may downconvert and sample the signal it receives from amplifier 220 to create a digital baseband signal. The transceiver may send the digitized baseband signal samples to the controller 230 for further processing. Further to this disclosed embodiment, the controller 230 may be configured to analyze the signals it receives from transceiver 225, determine one or more values indicative of received signal strength corresponding to the signal, and communicate the values to the ESC decision module 105 over the secure data link 115. The controller 230 may be implemented in various ways, for example, using one or more field programmable gate arrays (FPGA), processors, application specific integrated circuits (ASICs), digital signal processors (DSPs), graphics processing units (GPUs), and/or central processing units (CPUs). One skilled in the art would also appreciate that the controller 230 may also include additional hardware and software components, including for example a transmitter, one or more processors, and a memory, which are not shown in FIG. 2.

The controller 230 preferably includes software and/or logic for processing the received signals and determining the values indicative of signal strength of the received RF signals. In some embodiments, each sensor 200 preferably processes its own received signals using a respective controller 230. Alternatively, the sensor may employ a controller 230 located remotely, for example, at another sensor, SAS, or other computer in the network. In some embodiments, the controller 230 may comprise a channelizer for digitally channelizing the received baseband signal into one or more frequency channels. For example, in a preferred embodiment, the channelizer may discretize the baseband signal into individual, 10 MHz channels. The controller may further perform cyclostationary processing of each channel, leveraging known properties of a primary user waveform to determine if signals from the primary user are present in the received signal. If the primary user is detected in the received signal, based on the primary user's known signal properties, the controller 230 may calculate a coarse estimate of a signal strength of the baseband signal. The coarse estimate of signal strength may include values indicative of signal strength in one or more frequencies and/or frequency channels, and the values may be represented as received signal strength indicator (RSSI) values. In this context, a "coarse" estimate does not place specific precision requirements on the determined RSSI values, although the disclosed embodiments may adjust the precision of the RSSI values as desired for a given implementation.

The ESC decision module 105 receives the values indicative of signal strength from the plurality sensors 200 and further processes these received values to determine if a protection zone should be established to relocate, terminate, or limit secondary-user transmissions in a given area. A protection zone is implemented to reduce or eliminate potential interference with the RF signals of the primary user after the primary user has been detected by the ESC decision module. The ESC decision module 105 may be implemented on one or more of the sensors 200, or preferably the ESC decision module 105 may be implemented at a remote location relative to the sensors 200. Like the controller 230, the ESC decision module 105 may be implemented using one or more processors, FPGAs, ASICs, DSPs, GPUs, and/or CPUs.

The ESC decision module 105 communicates with one or SASs 120 in order to implement a protection zone. As described further below, each SAS has the ability to relocate secondary users to different frequencies or frequency channels, terminate their transmissions on one or more frequencies or frequency channels, and/or limit (e.g., restrict) the permissible transmission power of certain secondary users. Each SAS 120 may be configured to monitor secondary-user transmissions within a coverage area or for a number of secondary users. For example, information pertaining to secondary users may be maintained within an SAS database, which may include each registered secondary user within a geographic area or each registered secondary user within the control of the given SAS 120. In some embodiments, data related to the RF signal properties and/or hardware of the primary users also may be available to the ESC system 100 and may be used to determine a detection threshold for determining when a primary user is transmitting in a shared spectrum.

Further to the disclosed embodiments, information pertaining to secondary and/or primary users also may be obtained from third-party systems, such as an FCC and/or Department of Defense (DOD) database 135. Alternatively, the ESC system 100 and/or the SASs 120 may store secondary and/or primary user information in one or more databases accessible at the ESC system or SAS. In some embodiments, the ESC system 100 may be programmed to recognize certain primary users without storing their related RF signal properties and/or hardware details.

In one exemplary embodiment, the ESC decision module 105 and each SAS 120 may be implemented as software modules hosted on one or more cloud platforms. A cloud platform may comprise any distributed system having one or more software processes executed over a local or distributed network using at least one computer server or other computer hardware. The hardware may include computing devices (e.g., desktops, workstations, etc.), handheld computing devices, memory devices, network components, and/or interface components, which allow for network-based computing and shared resources over a distributed network. Cloud services are trusted by many of the largest federal and commercial enterprises in part because of the robust controls available to maintain security and data protection on the cloud platform. A cloud platform also provides flexibility with respect to resource allocation and remote access. The ESC decision module 105 and SAS 120 may be implemented on the same cloud platform or different cloud platforms that may be configured to communicate with one another.

Whether deployed on a shared cloud platform or on separate systems, the ESC system 100 communicates with the one or more SASs 120 at least for the purposes of communicating an indication that it has detected the presence of a RF signal from a primary user in the shared spectrum, and for obtaining information associated with secondary users within the control of each SAS 120. Each SAS 120 preferably includes at least location information and configuration data for each secondary user within its control. This information either may be stored in a database maintained by the SASs 120, or retrieved from one or more FCC/DOD databases 135.

Each SAS 120 may communicate with other SASs 120 in order to share data and communicate data to the ESC system 100. By sharing secondary-user information with the ESC system 100, the SAS 120 can provide information to the ESC system 100 that enables the ESC decision module 105 to determine a detection threshold for detecting a primary user. The detection threshold, discussed in more detail below, may be based on an acceptable level of interference from secondary users. SAS 120 may provide data pertaining to secondary users preferably to set a detection threshold that is the least intrusive to secondary users, while minimizing interference with primary users in the shared spectrum. After the ESC system 100 has detected a primary user using the shared spectrum, the ESC system 100 can determine a protection zone (e.g., corresponding to secondary users in a certain geographic area) and direct one or more SASs 120 to terminate, relocate, and/or limit transmissions (e.g., constrain the transmit power and/or bandwidth) from secondary users within the protection zone. This allows the ESC system 100 to determine and limit interference with primary users while primary users transmit in a spectrum shared with secondary users.

The information exchanged between SAS 120 and ESC system 100 may occur over a secure data link 125 using a wireless or wired interface and may employ a secure message protocol to maintain a desired level of communications security (COMSEC). Likewise, the sensors 200 of the ESC system 100 may be connected to the ESC decision module 105 via a secure data link 115, including low-latency wireless or wired interfaces. In some disclosed embodiments, the sensors 200 preferably send the ESC decision module 105 one or more coarsely time-stamped RSSI values corresponding to RF signals the sensor received in one or more frequencies or frequency channels. The ESC decision module 105 may use the coarsely time-stamped RSSI values to detect RF transmissions by at least one primary user in the one or more frequencies or frequency channels of the shared spectrum. In an exemplary embodiment, the total time for a primary user detection event, including processing by the sensor 200, time for data transmission, processing by the ESC decision module 105, and communication to one or more SASs 120, may take less than sixty seconds.

Figure 3:
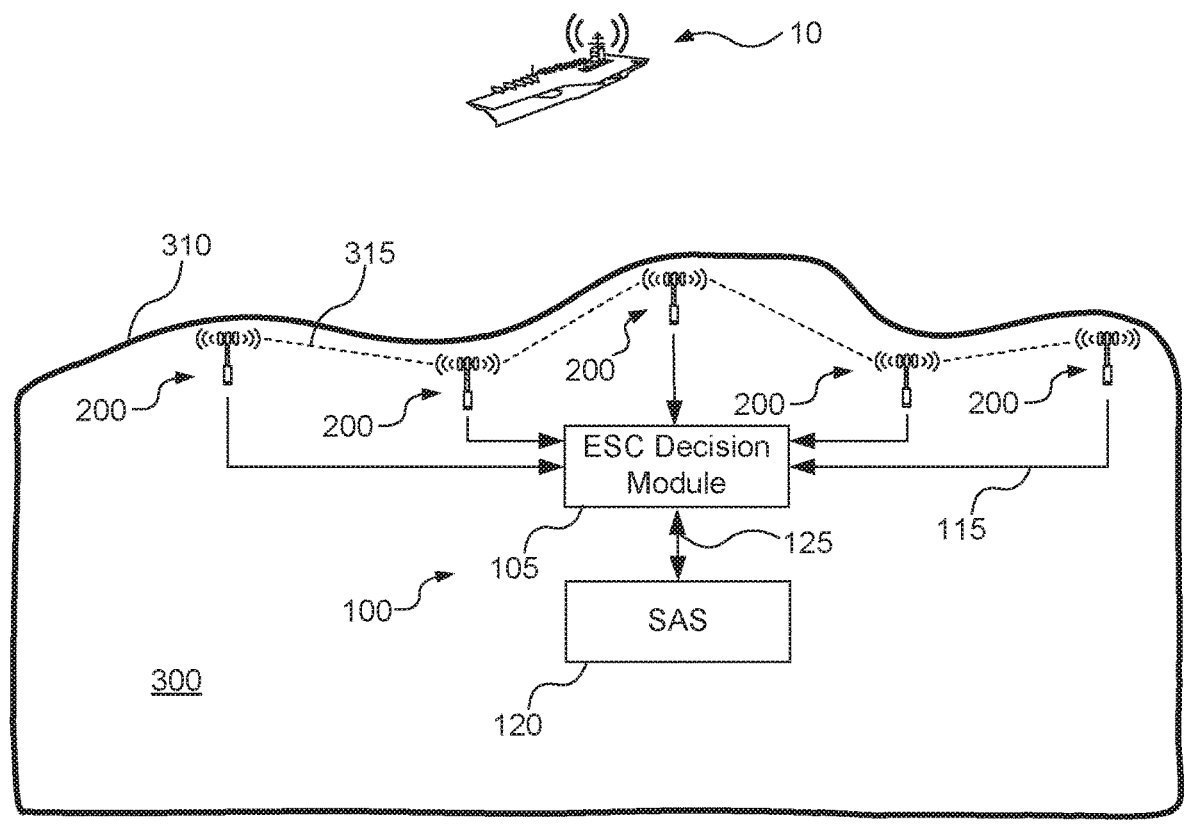
FIG. 3 is an exemplary configuration of the system according to FIG. 1 including a plurality of sensors deployed along a coastline in accordance with certain disclosed embodiments.

FIG. 3 shows an exemplary embodiment of the ESC system 100 in accordance with an illustrative embodiment. A plurality of sensors 200 are deployed along a coastline 310 separating land 300 from sea 305, wherein the antenna of each sensor 200 may be directed out to sea 305 to detect primary users 10 transmitting in a shared spectrum. The sensors 200 may be distributed over a wide area and communicate over secure data link 115 to the ESC decision module 105. The ESC decision module 105 communicates over secure data link 125 to one or more SASs 120 in order to transmit detection events to the SASs 120 when a primary user 10 is detected transmitting in the shared spectrum. In other words, when the ESC decision module detects transmissions from at least one primary user, the ESC decision module may send an indication of such a detection event to the SASs 120, for example, alone or in combination with other information provided to the SASs.

Each of the sensors 200 receives RF signals and processes the signals before communicating values indicative of signal strength to the ESC decision module 200. These values are based on the signal strength of the RF signal at each sensor location. In order to calculate values indicative of signal strength between the sensors 200, a path 315 is defined between the sensors 200. The path 315 preferably includes one or more linear segments from one sensor to another, each linear segment corresponding to a distance between different sensors. For example, the path 315 may comprise a sequence of linear segments along the perimeter of a geographic area, such as along a coastline. The ESC decision module 105 may use the path 315, together with the received signal strength values, to calculate signal strength values between sensor locations. In particular, the ESC decision module 105 may interpolate signal strength values along the path 315, including between adjacent sensors 200, in each frequency and/or frequency channel being monitored, based on the signal strength values that the ESC decision module received from the sensors 200 and the distances between sensors along the path 315. This provides the ESC decision module 105 with calculated signal strength values along a continuous path 315, where received and calculated signal strength values can be compared to a detection threshold at each location along the path 315, or at selected locations on the path.

Figure 4:
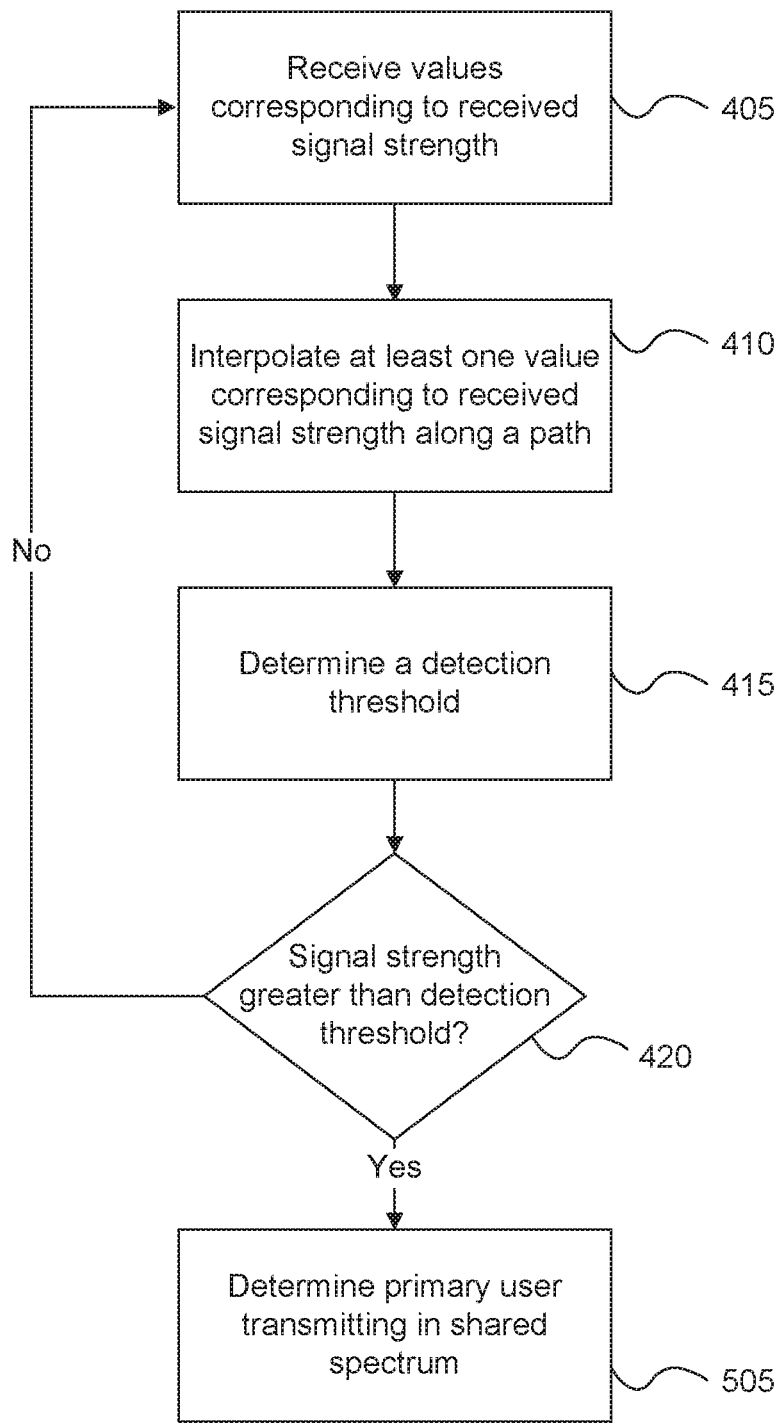
FIG. 4 is a flow chart illustrating an exemplary method for providing spectrum sensing capability in a network having at least one primary user and a plurality of secondary users communicating in a shared spectrum in accordance with the disclosed embodiments.
Figure 5:
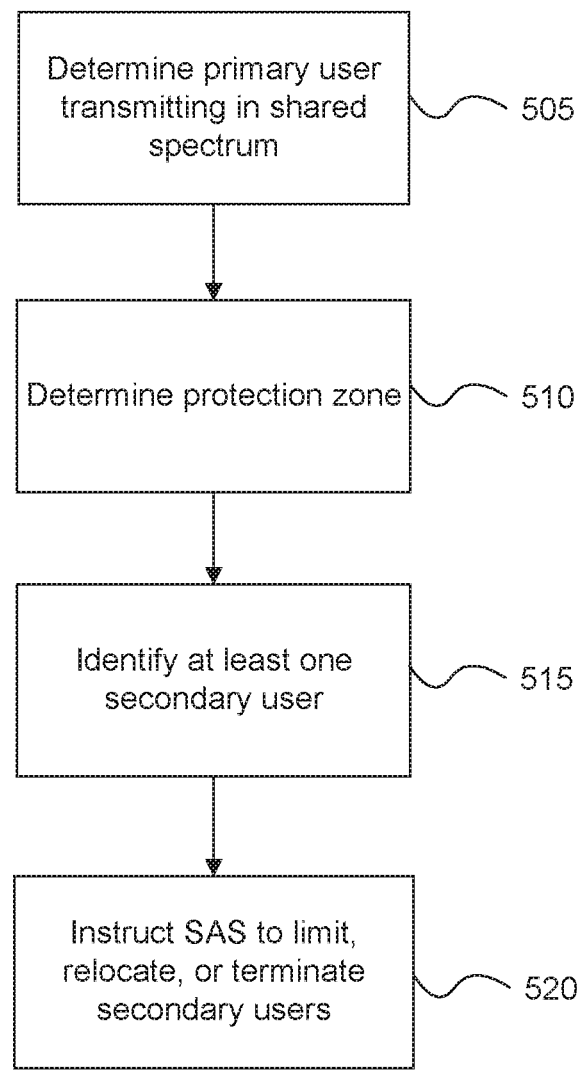
FIG. 5 is a flow chart illustrating an exemplary method of defining a protection zone and coordinating with one or more SASs to limit, relocate, or terminate RF transmissions of one or more secondary users in a shared spectrum in accordance with the disclosed embodiments.

FIGS. 4 and 5 provide flow diagrams outlining exemplary methods employed by the ESC decision module 105 in order to determine a detection threshold and then determine, from the detection threshold and received signal strength values, whether a primary user is transmitting in the shared spectrum. In one exemplary embodiment, the ESC decision module 105 may receive from the plurality of sensors 200 values indicative of received signal strengths from RF transmissions of at least one primary user 10 transmitting in one or more frequencies or frequency channels of the shared spectrum (Step 405). The ESC decision module may determine a path 315 between the sensors 200 to interpolate at least one additional value corresponding to a received signal strength between the sensors 200 at a location along the path 315 (Step 410). The values may be quantized RSSI values processed by the sensors 200, where the RSSI values are provided for each frequency channel in a given frequency range. Moreover, the RSSI values may be coarsely time-stamped in order to prevent back-calculation of the primary user's geographic location. Because they are coarsely time-stamped, the RSSI values may include timestamps that are not sufficiently precise to be useful in tracking location (e.g., providing timestamps with a precision on the order of hours or other relatively large blocks of time for each timestamp, rather than more precise timestamps with accuracies on the order of seconds or less).

As values indicative of signal strength are received by the ESC decision module 105, the values in each channel of the frequency range may be compared at each location along the path 315 to a detection threshold to determine if a primary user 10 transmitted a signal in the shared spectrum (Step 415). The detection threshold is a value calculated based on an acceptable amount of interference with the primary user, which in some embodiments may be dependent on the amount of secondary user activity and the primary user's signal characteristics and location. If the detection threshold is exceeded (Step 420), the ESC decision module will determine a primary user is transmitting in the shared spectrum (Step 505), determine a protection zone, and communicate the protection zone to the one or more SASs 120. The SASs implement the protection zone to control secondary-user transmissions so as to reduce interference with the detected primary user.

To maximize secondary user capacity and performance while ensuring primary user protection, ESC decision module 105 may set the detection threshold based on the amount of secondary user activity in an area around each sensor 200 or around each SAS 120. In determining the detection threshold, a lower threshold may be overly-limiting on secondary users operating in the area, while a higher threshold may not be sufficient to prevent interference with primary-user signals in the shared spectrum. When an SAS registers high secondary user activity in a given area (e.g., many secondary users transmitting in the shared spectrum), or when primary users are expected to transmit from farther distances from the sensors 200, the ESC decision module 105 may set a lower detection threshold. This will ensure primary users are detected and their transmissions in the shared spectrum are not significantly interfered with by the high volume of secondary users in the area or when the primary users are located at greater distances from the sensors 200 (e.g., when primary user signals may be attenuated based on path loss between the primary user and an antenna in the sensor 200). In contrast, a higher threshold may be used when secondary-user activity is low or when primary users are expected to be transmitting at closer distances to the sensor 200. In one embodiment, the detection threshold can be set regardless of secondary user activity, for example, such that the ESC decision module 105 may set a "worst-case" scenario of secondary user activity. This may result in a lower detection threshold and greater intrusion on secondary users operating in the area, but will ensure primary users are protected from secondary user interference.

In a preferred embodiment, the detection threshold is determined in Step 505 based on secondary user activity using actual secondary user location data as determined by each SAS 120. Secondary users must register with an SAS 120 in order to operate in a given area, and the SAS 120 can grant, deny, and/or limit requests to transmit in that area. Secondary-user location data and transmission characteristics are made available to the SAS at least upon registration of the secondary users with the SAS, and therefore can be used to determine actual secondary user activity in an area (e.g., as opposed to estimating or assuming "worst-case" secondary user activity). Alternatively, secondary user activity may include estimating activity based on a deployment density of secondary users and typical representations of secondary user parameters, including transmit power, antenna beamwidth and gain, and height. Rather than using actual activity, an estimation may therefore be used based on population or other data correlated with expected secondary user deployment. In either illustrative approach, the ESC decision module 105 may have access to a secondary user database from each SAS 120, allowing the ESC system 100 to dynamically determine detection thresholds at each location along the path 315 between sensors and in each channel of a given frequency range.

Referring to FIG. 5, an exemplary method of defining a protection zone is provided in accordance with the disclosed embodiments. After determining that one or more values indicative of signal strength exceed the detection threshold, the ESC decision module 105 determines that a primary user is transmitting in a shared spectrum (Step 505). In this situation, a protection zone is determined, for example, by the ESC decision module 105 (Step 510). The protection zone is an area where SASs 120 are instructed to relocate, terminate, or limit secondary-user transmissions to reduce or eliminate interference with the detected primary user's transmissions in the shared spectrum. After the protection zone is determined in Step 510, at least one secondary user can be identified (Step 515) in the protection zone. The SAS 120 can then limit, relocated, or terminate transmissions from the at least one identified secondary user.

Figure 6:
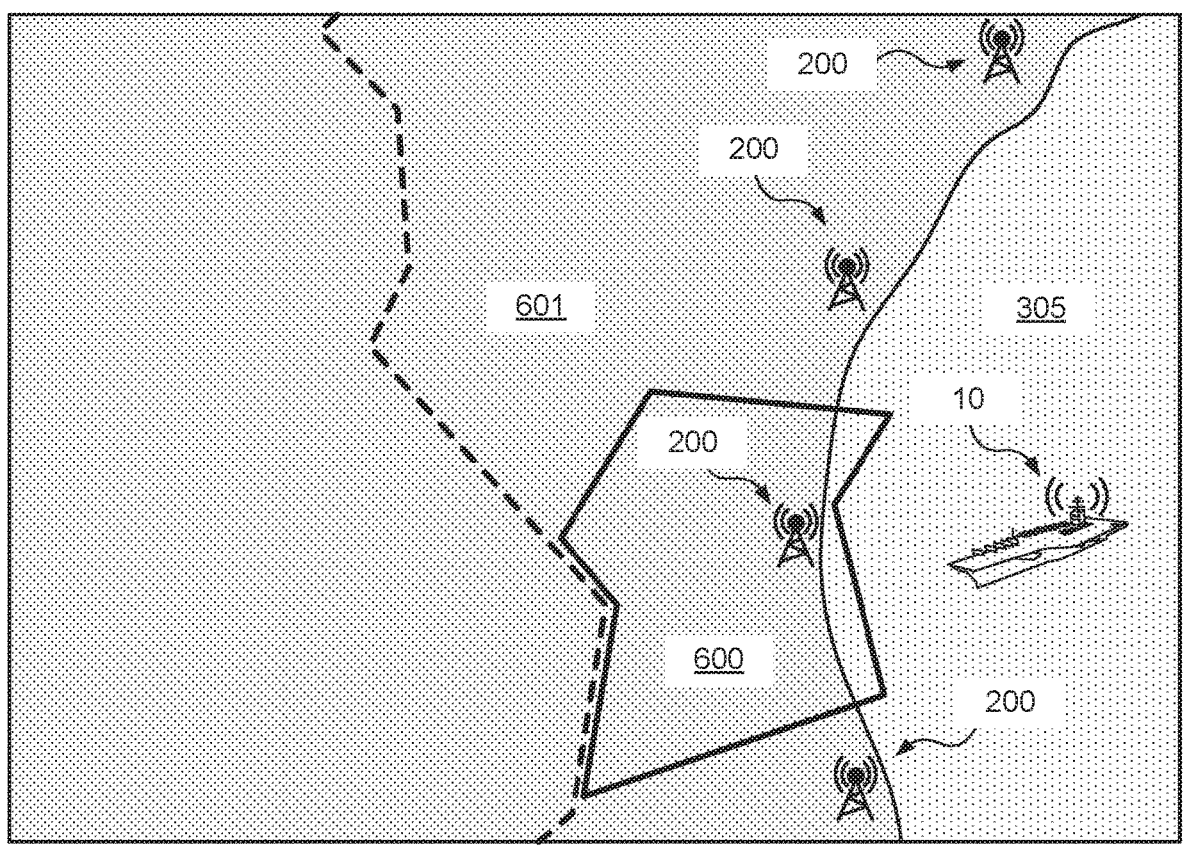
FIG. 6 is an exemplary configuration of the system according to FIG. 1 including a protection zone that has been determined based on a primary user transmitting in one or more frequencies of a shared spectrum in accordance with certain disclosed embodiments.

Referring to the exemplary embodiment in FIG. 6 and the methods of FIGS. 4 and 5, the ESC system 100 may detect transmissions from primary users 10 originating from an area monitored by the ESC sensors 200 (e.g., transmissions from military ships at sea 305). Values indicative of signal strength (e.g., RSSI values) for the signals received at sensors 200 are communicated to the ESC decision module 105. The ESC decision module 105 may identify (or "activate") a protection zone 600, which may be defined as a subset of an industry- or government-defined exclusion zone 601, if the signal strength values exceed the detection threshold. Examples of industry-defined exclusions zones 601 include zones defined by the Wireless Innovation Forum (WINNF) or similar industry alliances. Examples of government-defined exclusions zones 601 include zones defined by the National Telecommunications and Information Administration (NTIA).

Aggregate interference to primary users 10 is limited to an acceptable amount of interference by SAS instructions to secondary users within the protection zone 600. The instructions may direct certain secondary users to move from a channel or frequency range that would cause unacceptable interference with primary users transmitting in a given channel or frequency range. The SAS 120 instructs secondary users to relocate to different channels or frequency ranges, to cease transmissions, or to limit transmission power within the protection zone 600. Instructions are sent using an SAS-to-secondary-user protocol that may be defined by, for example, WINNF. Following detection of a primary user, the SAS may, in some embodiments, confirm suspension, relocation, or limitation of the secondary user transmissions to the ESC system 100. In some embodiments, confirmation may occur as soon as 300 seconds after the ESC system 100 communicates the detection event to the SAS 120.

FIGS. 7 through 10 show exemplary systems and methods that may be used to determine a detection threshold and an acceptable level of interference for primary users in accordance with certain disclosed embodiments. Sensors 200 of the ESC system 100 receive RF signals from one or more primary users 10 and process the signals into values indicative of signal strength (e.g., RSSI values). The RSSI values are communicated to the ESC decision module 105, which interpolates the RSSI values reported by each sensor to calculate an RSSI estimate along a path 315 between the sensors 200. The interpolation results in an estimated RSSI value for each channel in the frequency range as a function of a distance along the path 315 and at each location L (e.g., RSSI(L)). The ESC decision module 105 then determines the detection threshold for each location along the path 315 based on SAS-reported secondary user activity. The determined detection threshold is function of each sensor location, as well the quantity, location, and configuration of active secondary users. This ensures the detection threshold accounts for the aggregate interference created by secondary user activity. The interpolated RSSI(L) may then be compared to the detection threshold at each location (L) in order to determine whether a primary user is transmitting over a given frequency and/or frequency channel (range of frequencies) in the shared spectrum, and whether a protection zone should be determined to eliminate or minimize interference with the primary user. The following describes exemplary methods for determining the detection threshold and acceptable interference with a primary user's signal.

First, an acceptable interference with a known primary user signal is determined. In one example, an acceptable interference may calculated for an SPN-43 radar antenna of a primary user. Known characteristics of this radar antenna are utilized in the calculation, including a noise figure (N/F) and an interference to noise ratio (I/N). In the case of the SPN-43 radar antenna, the ESC decision module 105 will use known variables of 3 dB for a noise figure and an interference to noise ratio of −6 dB at the radar receiver. Together with the Boltzmann constant (kTB), an acceptable interference level at the SPN-43 radar receiver may be determined as shown in Equation (1); plugging in exemplary values results in Equation (2):

$$I_A = kTB + NF + I/N \quad (1)$$

$$I_A = -114 + 3 - 6 = -117 \text{ dBm/MHz} \quad (2)$$

Using this value, a detection threshold may be determined to ensure that the aggregate interference due to secondary users at locations along the path 315 between sensors 200 and received at the SPN-43 radar antenna is less than or equal to the acceptable interference.

For each location along the path 315, the ESC decision module calculates the aggregate interference based on the secondary users deployed within a specified distance 55 from the location along the path 315. For example, the distance 55 may be 150 kilometers from a location along the path in this exemplary embodiment. The calculation of aggregate interference may be calculated from actual secondary-user usage data from SASs, or may be performed assuming a worst-case number of secondary users transmitting within the specified distance 55. Such a worst-case estimate may also assume the primary user is at a maximum useful distance 20 from the path 315 for its given hardware. In the case of the SPN-43 radar, it may be assumed for the worst-case scenario, that the radar is transmitting at a range of 65 nautical miles from the path 315.

Figure 7:
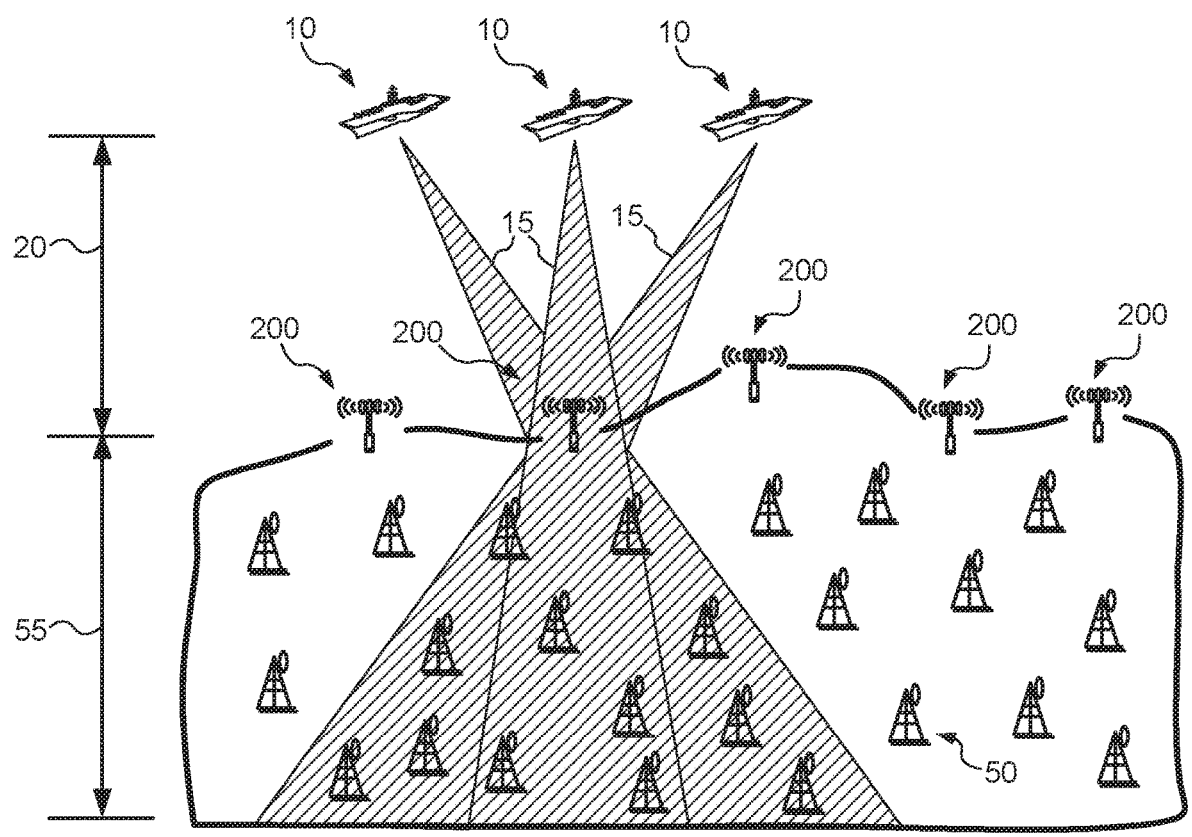
FIG. 7 is an exemplary configuration of the system according to FIG. 1 which may be configured to estimate interference with one or more primary users transmitting in the shared spectrum in accordance with certain disclosed embodiments.
Figure 8:
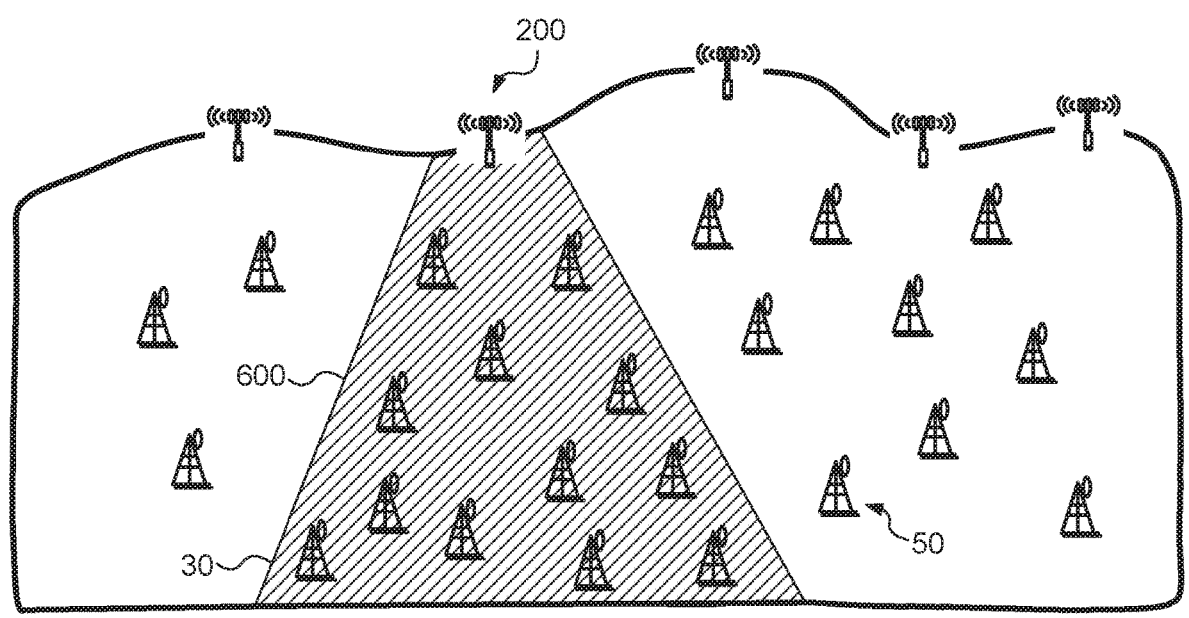
FIG. 8 is an exemplary configuration of the system according to FIG. 1 which may be configured to determine the protection zone based on estimated interference with the one or more primary users transmitting in the shared spectrum in accordance with certain disclosed embodiments.

To calculate aggregate interference in some embodiments, the ESC decision module 105 may determine the number of secondary users within a radial 15 of the primary user signal, as shown in FIGS. 7 and 8. The radial 15 is an area in which a signal from the primary user 10 propagates. In particular, the ESC decision module 105 may first determine RF transmission radials from a predetermined maximum useful distance 20 (e.g., 65 nautical miles) from the path 315 and passing through the path at a given set of locations. Characteristics of the primary users' antennas are utilized, including the antenna's horizontal beamwidth. In the case of the SPN-43 radar, the beamwidth 15 may be 1.75 degrees. As shown in FIG. 7, the radials 15 from one or more primary users 10 may be calculated in this fashion. After determining the radial 15 of the primary user or users 10, the ESC decision module 105 may use the radials 15 to determine which secondary users 50 may potentially cause interference to the primary users 10. Where several radials 15 are calculated, a combined transmission area 30 may be determined based on their aggregate coverage areas as shown in FIG. 8. These secondary users 50 located within this area 30 will be utilized in the determination of aggregate interference.

Assuming there are $N_r$ secondary users in the $r^{th}$ radial, the effective isotropic radiated power (EIRP) from each secondary user ($CBSD_{n,r}$) and in the direction of the primary user antenna is denoted $EIRP_{CBSD}^{SPN-43}$. As a worst-case estimate, the ESC decision module calculates the path loss between secondary user ($CBSD_{n,r}$) and a location along the path, L, using free space path loss ("FSPL"). The aggregate interference from L and from a particular radial, r, is then estimated as Imax(L,r) below, where all quantities are expressed using linear scale.

$$Imax(L, r) = \sum_{n=0}^{N_r - 1} \frac{EIRP_{CBSD_{n,r}}^{SPN-43}}{FSPL(CBSD_{n,r} \to L)} \quad (3)$$

In this embodiment, the ESC decision module may then compute the aggregate interference Imax(L,r) across all radials 15 and at a location along the path 315 where the radials 15 intersect the path 315. Once the aggregate interference from secondary users is calculated, the protection zone 600 can be determined. The interference due to aggregate interference, Imax(L,r), by secondary users may then be calculated at the primary user's location. Using the known characteristics of the primary user and path loss (PL) from path 315 to the primary users, interference may be calculated as:

$$I=Imax(L,r)-PL+Gradar-Lradar \quad (4)$$

Gradar is the gain of the primary user and Lradar is the radar receiver losses of the primary user (e.g., due to cabling, etc.). For the SPN-43 radar, Gradar is known as 32 dBi and Gradar is known as 2 dB. Therefore, I=Imax(L,r)−PL+32 dBi−2 dB=Imax(L,r)+30−PL. Setting interference (I) equal to the acceptable interference ($I_A$), the ESC decision module can calculate path loss (PL) for the SPN-43 radar. That is, the minimum PL for protecting the primary user radar receiver from aggregate interference of secondary users (Imax(L,r)) based on a worst-case scenario can be obtained by solving for PL where I=$I_A$.

$$I=I_A$$

$$kTB+NF+I/N=Imax(L,r)-PL+Gradar-Lradar$$

$$-117 \text{ dBm/MHz}=Imax(L,r)-PL+32 \text{ dBi}-2 \text{ dB}$$

$$PL=147 \text{ dB}+Imax(L,r) \text{ dBm/MHz} \quad (5)$$

Therefore, path loss (PL) is a function of aggregate interference (Imax(L,r)) from secondary users at each location along the path between sensors. In one example in which a single Category B rural CBSD secondary user is located on the path, Imax(L,r)=37 dBm/MHz and, hence, PL=184 dBm/MHz.

A detection threshold may then computed for each location (L) along the path and for each radial (r). The detection threshold DetThresh(L,r) at east location and for each radial is calculated as a function of effective isotropic radiated power (EIRP) from the primary user less path loss (PL).

$$DetThresh(L,r)=EIRPradar/MHz-PL \quad (6)$$

EIRP (i.e., effective isotropic radiated power) is a known characteristic of a primary user and accessible or otherwise available to the ESC decision module 105. For instance, the SPN-43 radar has a EIRP of 120 dBm/MHz. And using the example of one rural Category B CBSD with Imax(L,r)=37 dBm/MHz, the detection threshold is calculated as follows:

$$DetThresh(L,r)=EIRPradar/MHz-PL$$

$$DetThresh(L,r)=EIRPradar/MHz-(147 \text{ dB}+Imax(L,r) \text{ dBm/MHz})$$

$$DetThresh(L,r)=120 \text{ dBm/MHz}-147 \text{ dB}-Imax(L,r)$$

$$DetThresh(L,r)=-27-Imax(L,r) \text{ dBm/MHz}$$

$$DetThresh(L,r)=-27-37 \text{ dBm/MHz}=-64 \text{ dBm/MHz} \quad (7)$$

Using this detection threshold (DetThresh(L,r)), a protection zone 600 may then be determined by the intersection of the transmission area 30 for which:

$$RSSI(L)>DetThresh(L,r) \quad (8)$$

Therefore, where RSSI values exceed the detection threshold along the path 315 defined between sensors 200, a protection zone 600 is determined as defined by the transmission area 30 extending over one or more secondary users 50. The ESC system 100 may alert the SASs 120 in the protection zone 30 of the detection event, and the SASs may then relocate, limit, or terminate transmissions from the secondary users 50 in the protection zone 30.

Figure 9:
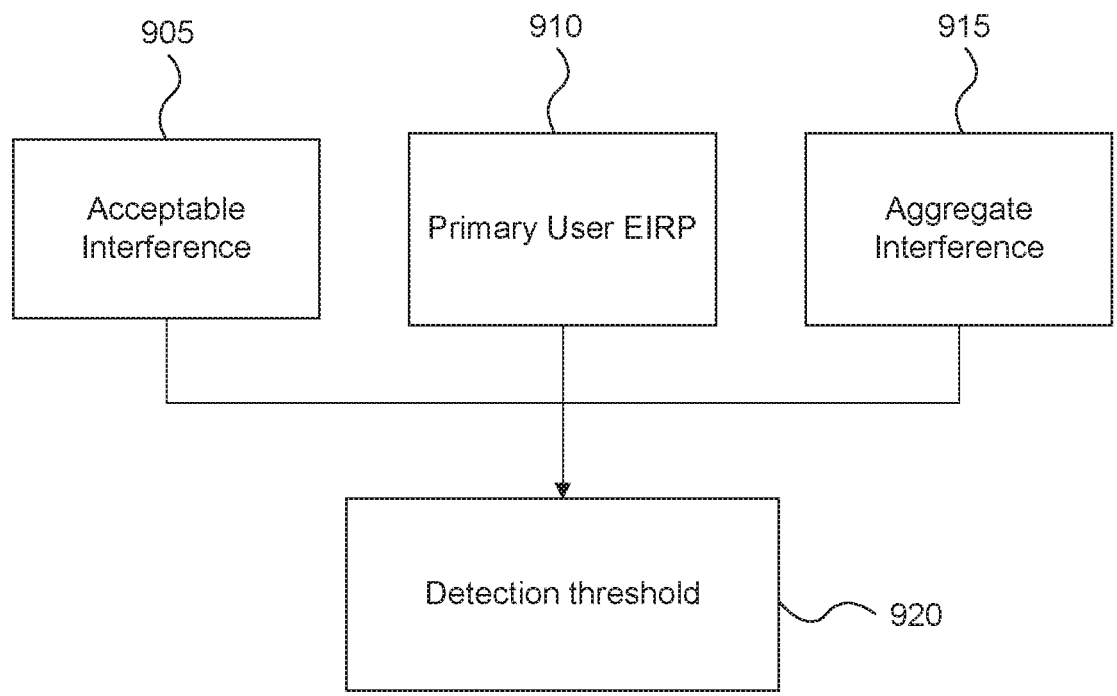
FIG. 9 is a schematic block diagram illustrating exemplary inputs that may be used to determine the detection threshold in accordance with the disclosed embodiments.
Figure 10:
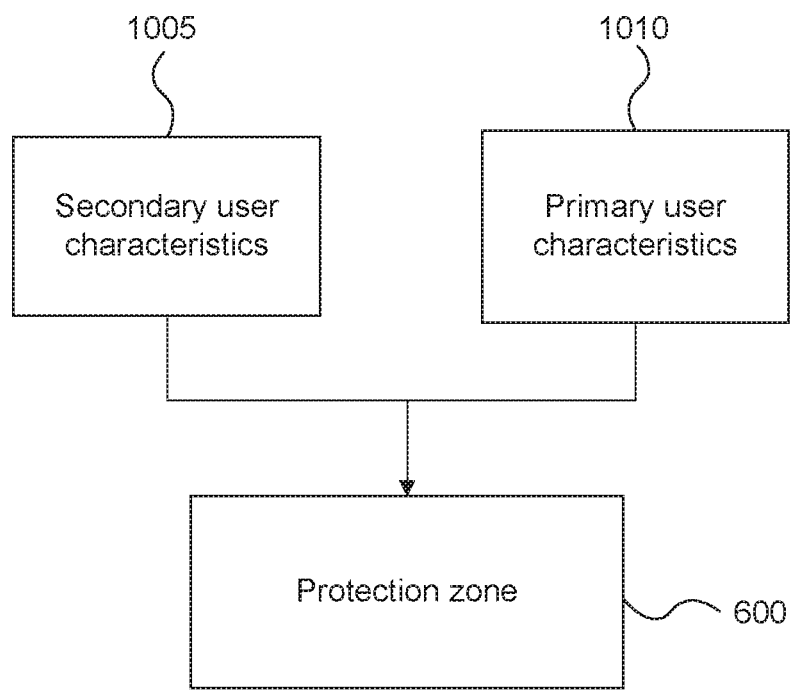
FIG. 10 is a schematic block diagram illustrating exemplary inputs that may be used to determine a protection zone in accordance with the disclosed embodiments.

FIGS. 9 and 10 show exemplary inputs for calculating the detection threshold 920 and the protection zone 600 in accordance with certain disclosed embodiments. The detection threshold (DetThresh(L,r)) is calculated for each location along the path 315 between sensors and for each radial 15 of the primary user 10. Inputs for the detection threshold, as described above, include the acceptable interference (I) 905 with the primary user, the effective isotropic radiated power (EIRP) 910 of the primary user, and the aggregate interference (Imax(L,r)) 915 from secondary users. After the detection threshold is calculated, a detection event can be triggered when the values indicative of signal strength exceed the detection threshold at a given location along the path 315 between sensors. If exceeded, the ESC decision module 105 may use inputs including secondary-user characteristics 1005 (e.g., aggregate interference (Imax(L,r)), etc.) and primary user characteristics 1010 (e.g., horizontal beamwidth, etc.) to determine a protection zone 600. One or more SAS can relocate, limit, or terminate one or more secondary users in the protection zone 600.

In order to maintain operational security of primary users, the detection threshold and calculated interference with the primary user does not allow the exact position of the primary user to be determined if the ESC system is compromised. More specifically, at no point during a detection event does the ESC system 100 predict or estimate the propagation loss from the primary user. This avoids creating an input for geolocation computation of the primary user. Moreover, at no point is the location of a primary user accurately estimated or tracked. In this manner, the ESC system 100 does not compute or reveal any information pertaining to the location or movement of any primary user transmitting in a shared spectrum.

Therefore, the ESC system 100 is designed to operate without any connectivity to any sensitive database or system of a primary user (e.g., military or federal primary user). The ESC system 100 also does not store, retain, transmit, or disclose operational information regarding the movement or position of any primary user or any information that reveals other operational information that is not required to effectively determine a detection threshold, establish a protection zone, and compare signal strength values to the detection threshold.

To maintain operational security, the ESC system 100 will only report coarsely timestamped, quantized signal strength measurements to the SAS 120. These measurements will not be stored or retained by the ESC sensors 200 or the ESC decision module 105. Processing of signal strength measurements will be limited to comparison of the measured signal strength values against the detection threshold. Furthermore, the ESC system 100 will not store or transmit any time-series data for detected primary users, store or transmit signal waveform characteristics from a primary user, timestamp measurements with precision sufficient to enable Time Difference of Arrival geolocation techniques, or employ sensors with receivers or antennas capable of precise angle or arrival estimation.

Additionally, to prevent unintended disclosure of operational information on the movement or position of any primary user, the ESC system 100 will maintain a position estimate uncertainty in the range of 25-65 nautical miles. In order to accomplish this, the detection threshold calculation assumes a reciprocal path loss for RF signals from a primary user to an ESC sensor 200, and to a primary user from an ESC sensor 200. propagation. At no point during a detection event does the ESC system 100 predict or estimate the primary user's propagation loss, which is a necessary input to a geolocation computation.

Reciprocal path loss relies on the observation that propagation loss from a distant primary user (e.g., from a radar) to a sensor location will be equal to or less than the propagation loss from the sensor location to the same primary user (e.g., to a radar receiver). Therefore the path loss determined for signals transmitted from a primary user 10 to a sensor 200 is assumed to equal the path loss for signals transmitted in the opposite direction from the sensor 200 to the primary user 10. Therefore, the ESC decision module 105 need only establish an appropriate signal reception level (i.e., the detection threshold) from the primary-user transmission to determine if the aggregate signal transmissions from secondary users to the primary user will exceed an acceptable limit. To establish the detection threshold, the ESC decision module 105 models the propagation loss from the location of each secondary user to a location along the path 315 where the outgoing propagation loss to the primary user can be applied. Using this approach, the only signal processing conducted by the ESC decision module 105 and sensor 200 is interpolation of the signal strength values and comparison of the interpolated data against a determined detection threshold.

While ensuring end-to-end security, if an adversary were to obtain RSSI measurements from multiple sensors 200 and the adversary had knowledge of the location of the sensor 200, it could at most perform trilateration for coarse incumbent position estimation. Trilateration relies on distance estimates from three or more sensors. An adversary may estimate distance from each sensor 200 to a primary user 10 using the RSSI values, sensor position, and a link budget analysis. The following variables would be used as inputs to the link budget analysis would be Radar Transmit Power ($P_T$), Propagation Loss ($P_L$), and Sensor Antenna Gain ($G_R$). Radar Transmit Power depends on conducted power and radar antenna gain in direction of sensor. Propagation Loss depends on clutter loss (e.g., reflection off structures near radar, sensor), sea state, atmospheric conditions (e.g., ducting), terrain, buildings, etc. And Sensor Antenna Gain depends on sensor antenna gain in direction of radar. The link budget analysis would be used to estimate the $P_L$ providing the measured RSSI. From $P_L$ and a propagation model providing the relationship between $P_L$ and distance, distance could be estimated as follows:

$$RSSI = P_T + P_T + G_R$$

$$PL = RSSI - P_T - G_R \quad (9)$$

Propagation loss can then be used to estimate distance. However, there are several uncertainties involved in the distance estimation and trilateration process. These uncertainties derive from (1) estimations used for radar conducted power and antenna gain, (2) estimates used for sensor antenna gain, (3) the propagation model employed (e.g., clutter, sea-state, atmospheric conditions), and (4) integration period misalignments with radar pulses in both time and space. These uncertainties will typically lead to an RSSI estimate that has uncertainty characterized by a standard deviation of more than 5 dB. Subsequent use of these RSSI values to estimate distance therefore leads to a large extrapolated distance uncertainty.

To illustrate how distance uncertainties may lead to trilateration uncertainty, a Monte Carlo simulation using four sensors equally spaced by 50 kilometers along the coastline and a primary user 50 kilometers offshore has been shown to result in position estimate with a standard deviation around 25 km. The simulation assumptions included using a free space path loss assumption and a measured RSSI value that is Gaussian, with a mean given by the exact RSSI and standard deviation of 2 dB. In most deployments, however, the RSSI standard deviation will be at least 5 dB. In addition, one will not know the precise relationship between distance and path loss given the limited fidelity of existing propagation models. As a result, the position estimate uncertainty of the ESC system 100 using a trilateration process to estimate the location of the primary user 10 will typically exceed 50 km.

In addition to operational security, the ESC system includes safeguards to maintain communications security. In particular, the ESC system 100 includes an architecture that ensures unauthorized parties cannot access or alter the ESC components or software, access or alter individual sensors, or otherwise corrupt the operation of the ESC system. Threats to the ESC include unauthorized access, alteration, or corruption of ESC software functions, unauthorized use of the sensors, and intrusion and/or tampering with sensor hardware, software, or functions. Additional security threats include Internet-connected devices that may probe an SAS via spectrum access queries and, as a result, learn information about primary users (e.g., location, movement, spectrum use, etc.) at a higher level of fidelity than can be discovered through other publicly available information sources (e.g., news reports about naval activity).

The ESC system 100 deploys at least the following measures to ensure that ESC decision module 105, sensor 200, and SAS 120 operations are not compromised by attack, damage, or unauthorized access. Software functions for the ESC system (e.g., the ESC decision module) and the SAS may be hosted in a secure cloud environment. Moreover, to prevent unauthorized use, each sensor 200 may employ a secure boot function to ensure that the sensor 200 can only be operated when authenticated by, and communicating with, the ESC decision module. Each sensor 200 may also use an intrusion monitor to sense when the a physical portion of the sensor or system is opened by an unauthorized entity. The sensors 200 may also contain a compass to determine the orientation of the sensor. When unauthorized intrusion or an unexpected orientation change is sensed, an alert in the ESC system 100 can be triggered to take appropriate measures (e.g., deactivate the compromised ESC sensor, trigger an alarm signal, etc.).

In addition, the communications between the ESC system 100 and SASs 120, and between SASs 120, are secure. A proprietary interface between the ESC and the SAS may be used when signals are conveyed between the ESC decision module 105 and the one or more SASs 120. Secure communications between the SAS 120 and ESC system 100 may include use of industry-recognized PM certificates, which include a hierarchical set of roles, policies, and procedures needed to mutually authenticate, create, manage, distribute, use, store, and revoke digital certificates and manage public-key encryption. The purpose of the PM structure is to facilitate legitimate electronic communications between the SASs 120 and the ESC system 100 in a secure manner. To protect the exchange of information and communications between the SAS and ESC system, TLS—a protocol created to provide authentication, confidentiality, and data integrity between two communicating applications—may also be used with the PM structure.

In addition to communications and operational security, the deployment of sensors 200 may be organized so as to maintain security and to maximize coverage of a particular region where primary users are expected to be transmitting. ESC system equipment may be installed on commercially available communications towers, building rooftops, poles, or other structures that are sufficiently elevated with respect to local clutter, and where the sensor antennas may be provided an unobstructed line-of-sight to the horizon. Each sensor deployment location is selected to ensure it meets access and physical security requirements necessary to ensure the sensor is operated in a safe and secure manner, and that the general public and unauthorized persons cannot gain access to the sensor. While exemplary examples of sensor deployment locations provided here include coastal areas, it is understood that sensors can be installed in any region in which the detection of primary users is desired (e.g., along inland location). Further, while the disclosed embodiments are described as including a plurality of sensors 200, those skilled in the art will appreciate that certain aspects disclosed herein also may be implemented with deployments having only a single ESC sensor 200.

Each sensor may be handled and installed by professional installers. The installation team preferably follows industry standard processes to ensure that sensors are securely handled and installed on sites. Access to site facilities may be limited to authorized personnel, contractors or subcontractors, and persons authorized to access the site by the facility owner or authorized manager. All sensor installations preferably complies with government rules governing wireless facility siting.

The ESC sensors are ideally positioned at locations above average terrain to allow for unobstructed views of a region to be monitored. In exemplary deployments, ESC sensors 200 may be spaced on average thirty to forty kilometers apart, and the precise sensor deployment locations will be determined to ensure that at least three sensors are capable of sensing each location in the region to be monitored 50 km from the path defined between the sensors. The use of multiple sensors results in a resilient, high-availability system and ensures that the ESC system can reliably detect primary user transmissions.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for providing spectrum sensing capability in a region having at least one primary user and at least one secondary user configured to communicate using a shared spectrum, the method comprising:
   receiving signals from a plurality of sensors positioned at different locations in the region;
   determining, based on the received signals, values corresponding to received signal strength from the at least one primary user in one or more frequencies of the shared spectrum,
   using the values determined based on the received signals from the plurality of sensors to determine the area in which a primary user is active;
   determining a threshold based on data associated with the at least one secondary user;
   determining that the at least one primary user is transmitting in the one or more frequencies of the shared spectrum upon any of the values determined based on the received signals from the plurality of sensors exceeding the threshold; and
   identifying a secondary user whose transmit power must be limited in the one or more frequencies based on the determination that the at least one primary user is transmitting in the one or more frequencies.

2. The method of claim 1, wherein the one or more frequencies of the shared spectrum correspond to one or more frequency channels, and the values corresponding to received signal strength are determined through cyclostationary processing of each channel based on known properties of a primary user waveform.

3. The method of claim 1, wherein the values corresponding to received signal strength are determined using cyclostationary processing based on known properties of a primary user waveform.

4. The method of claim 1, wherein the values corresponding to received signal strength comprise Received Signal Strength Indicator (RSSI) values.

5. The method of claim 4, wherein the values corresponding to received signal strength further comprise time-stamped RSSI values.

6. The method of claim 1, further comprising:
   determining a protection zone in the region based on the determination that the at least one primary user is transmitting in the one or more frequencies of the shared spectrum; and
   identifying a secondary user in the protection zone whose transmit power must be limited in the one or more frequencies.

7. The method of claim 6, wherein the protection zone is further determined based on characteristics of a signal transmitted from the at least one primary user.

8. The method of claim 7, wherein the signal characteristics include a direction or a beam width.

9. The method of claim 6, further comprising:
   receiving information regarding the at least one secondary user in the region from a Spectrum Access System (SAS); and
   identifying the secondary user in the protection zone whose transmit power must be limited in the one or more frequencies based on the information received from the SAS.

10. The method of claim 1, further comprising:
    determining a path loss for signals transmitted from the at least one primary user to a sensor in the plurality of sensors; and
    using the determined path loss to determine the threshold.

11. The method of claim 10, wherein the path loss determined for signals transmitted from the at least one primary user to the sensor in the plurality of sensors is assumed to equal the path loss for signals transmitted in the opposite direction from the sensor to the at least one primary user.

12. The method of claim 1, wherein determining that the at least one primary user is transmitting in the one or more frequencies of the shared spectrum is performed without compromising the location of the at least one primary user in the region.

13. The method of claim 1, further comprising instructing a Spectrum Access System (SAS) to limit, relocate, or terminate the at least one secondary user using the one or more frequencies in the region if it is determined that the at least one primary user is transmitting over the one or more frequencies.

14. The method of claim 1, wherein the at least one secondary user comprises a Citizens Broadband Service Device (CBSD).

15. The method of claim 1, wherein an acceptable amount of interference is determined based on a noise figure and an interference-to-noise ratio corresponding to a signal transmitted from the at least one primary user.

16. The method of claim 1, further comprising:
determining an aggregate amount of interference based on data associated with a plurality of secondary users; and
determining the threshold such that the aggregate amount of interference is less than or equal to an acceptable amount of interference.

17. The method of claim 16, further comprising:
calculating the aggregate amount of interference at a sensor in the plurality of sensors using a path loss of one or more secondary users located within an area, wherein the area is determined based on characteristics of a signal transmitted from the at least one primary user.

18. A system configured to provide spectrum sensing capability in a region having at least one primary user and at least one secondary user configured to communicate using a shared spectrum, the system comprising:
a memory storing instructions for execution by a processor; and
a processor configured to execute the stored instructions to:
receive signals from a plurality of sensors positioned at different locations in the region;
determine, based on the received signals, values corresponding to received signal strength from the at least one primary user in one or more frequencies of the shared spectrum,
use the values determined based on the received signals from the plurality of sensors to determine the area in which a primary user is active;
determine a threshold based on data associated with the at least one secondary user;
determine that the at least one primary user is transmitting in the one or more frequencies of the shared spectrum upon any of the values determined based on the received signals from the plurality of sensors exceeding the threshold; and
identify a secondary user whose transmit power must be limited in the one or more frequencies based on the determination that the at least one primary user is transmitting in the one or more frequencies.

19. The system of claim 18, wherein the one or more frequencies of the shared spectrum correspond to one or more frequency channels, and the values corresponding to received signal strength are determined through cyclostationary processing of each channel based on known properties of a primary user waveform.

20. The method of claim 18, wherein the values corresponding to received signal strength are determined using cyclostationary processing based on known signal properties of a primary user waveform.

21. The method of claim 18, wherein the values corresponding to received signal strength comprise Received Signal Strength Indicator (RSSI) values.

22. The method of claim 21, wherein the values corresponding to received signal strength further comprise time-stamped RSSI values.

23. The system of claim 18, wherein the processor is further configured to:
determine a protection zone in the region based on the determination that the at least one primary user is transmitting in the one or more frequencies of the shared spectrum; and
identify a secondary user in the protection zone whose transmit power must be limited in the one or more frequencies.

24. The system of claim 23, wherein the protection zone is further determined based on characteristics of a signal transmitted from the at least one primary user.

25. The system of claim 24, wherein the signal characteristics include a direction or a beam width.

26. The system of claim 23, wherein the processor is further configured to:
receive information regarding the at least one secondary user in the region from a Spectrum Access System (SAS); and
identify the secondary user in the protection zone whose transmit power must be limited in the one or more frequencies based on the information received from the SAS.

27. The system of claim 18, wherein the processor is further configured to:
determine a path loss for signals transmitted from the at least one primary user to a sensor in the plurality of sensors; and
use the determined path loss to determine the threshold.

28. The system of claim 27, wherein the path loss determined for signals transmitted from the at least one primary user to the sensor in the plurality of sensors is assumed to equal the path loss for signals transmitted in the opposite direction from the sensor to the at least one primary user.

29. The system of claim 18, wherein determining that the at least one primary user is transmitting in the one or more frequencies of the shared spectrum is performed without compromising the location of the at least one primary user in the region.

30. The system of claim 18, further comprising instructing a Spectrum Access System (SAS) to limit, relocate, or terminate the at least one secondary user using the one or more frequencies in the region if it is determined that the at least one primary user is transmitting over the one or more frequencies.

31. The system of claim 18, wherein the at least one secondary user comprises a Citizens Broadband Service Device (CBSD).

32. The system of claim 18, wherein the processor is further configured to determine an acceptable amount of interference based on a noise figure and an interference-to-noise ratio corresponding to a signal transmitted from the at least one primary user.

33. The system of claim 18, wherein the processor is further configured to:
determine an aggregate amount of interference based on data associated with a plurality of secondary users; and determine the threshold such that the aggregate amount of interference is less than or equal to an acceptable amount of interference.

34. The system of claim 33, wherein the processor is further configured to:

calculate the aggregate amount of interference at a sensor in the plurality of sensors using a path loss of one or more secondary users located within an area, wherein the area is determined based on characteristics of a signal transmitted from the at least one primary user.

35. A non-transitory computer readable medium storing instructions for execution by at least one processor, the instructions when executed being configured to cause the at least one processor to perform a method for providing spectrum sensing capability in a region having at least one primary user and at least one secondary user configured to communicate using a shared spectrum, the method comprising:

receiving signals from a plurality of sensors positioned at different locations in the region;

determining, based on the received signals, values corresponding to received signal strength from the at least one primary user in one or more frequencies of the shared spectrum, using the values determined based on the received signals from the plurality of sensors to determine the area in which a primary user is active;

determining a threshold based on data associated with the at least one secondary user;

determining that the at least one primary user is transmitting in the one or more frequencies of the shared spectrum upon any of the values determined based on the received signals from the plurality of sensors exceeding the threshold; and identifying a secondary user whose transmit power must be limited in the one or more frequencies based on the determination that the at least one primary user is transmitting in the one or more frequencies.

36. The method of claim 1, wherein the data associated with the at least one secondary user comprises signal strength.

37. The system of claim 18, wherein the data associated with the at least one secondary user comprises signal strength.

38. The non-transitory computer readable medium of claim 35, wherein the data associated with the at least one secondary user comprises signal strength.

39. The method of claim 10, wherein the path loss is a function of aggregate interference from a plurality of secondary users.

40. The system of claim 27, wherein the path loss is a function of aggregate interference from a plurality of secondary users.

* * * * *